United States Patent
Baba

(10) Patent No.: US 7,467,322 B2
(45) Date of Patent: Dec. 16, 2008

(54) FAILOVER METHOD IN A CLUSTER COMPUTER SYSTEM

(75) Inventor: Tsunehiko Baba, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 540 days.

(21) Appl. No.: 11/201,328

(22) Filed: Aug. 11, 2005

(65) Prior Publication Data

US 2006/0224728 A1 Oct. 5, 2006

(30) Foreign Application Priority Data

Apr. 4, 2005 (JP) ............................. 2005-107019

(51) Int. Cl.
G06F 11/00 (2006.01)

(52) U.S. Cl. .................. 714/4; 714/9; 714/10; 714/11; 714/23; 714/24

(58) Field of Classification Search ............... 714/9–12, 714/23, 4
See application file for complete search history.

(56) References Cited

U.S. PATENT DOCUMENTS

| | | | | |
|---|---|---|---|---|
| 5,283,903 | A * | 2/1994 | Uehara | 710/200 |
| 6,138,248 | A | 10/2000 | Saito et al. | |
| 6,526,521 | B1 * | 2/2003 | Lim | 714/4 |
| 6,654,648 | B2 * | 11/2003 | Nada et al. | 700/19 |
| 6,697,973 | B1 * | 2/2004 | Baumeister et al. | 714/55 |
| 6,981,170 | B2 * | 12/2005 | Nakagawa et al. | 714/4 |
| 7,024,550 | B2 * | 4/2006 | Collins et al. | 713/2 |
| 7,062,591 | B2 * | 6/2006 | Pecone | 710/308 |
| 7,155,485 | B2 * | 12/2006 | Clow et al. | 709/207 |
| 7,174,483 | B2 * | 2/2007 | Becher et al. | 714/55 |
| 7,240,234 | B2 * | 7/2007 | Morita et al. | 714/4 |
| 7,418,627 | B2 * | 8/2008 | Baba | 714/24 |
| 2002/0152425 | A1 * | 10/2002 | Chaiken et al. | 714/23 |
| 2003/0005229 | A1 * | 1/2003 | Rangan | 711/122 |
| 2003/0065836 | A1 * | 4/2003 | Pecone | 710/62 |
| 2003/0167363 | A1 * | 9/2003 | Sakaba et al. | 710/100 |
| 2003/0237018 | A1 * | 12/2003 | Baba | 714/4 |
| 2005/0213498 | A1 * | 9/2005 | Appanna et al. | 370/216 |
| 2005/0223284 | A1 * | 10/2005 | Strickland et al. | 714/23 |
| 2005/0228947 | A1 * | 10/2005 | Morita et al. | 711/114 |
| 2005/0289390 | A1 * | 12/2005 | Baba | 714/11 |

FOREIGN PATENT DOCUMENTS

JP 10-207855 1/1997

* cited by examiner

*Primary Examiner*—Scott T. Baderman
*Assistant Examiner*—Loan Truong
(74) *Attorney, Agent, or Firm*—Reed Smith LLP; Stanley P. Fisher, Esq.; Juan carlos A. Marquez, Esq.

(57) ABSTRACT

In a computer system having a cluster configuration, a reset command issued from each of computers to any of the other computers is transmitted to a reset control unit. A control module of the reset control unit judges whether a target of the newly inputted reset command conflicts with a target and a source of a reset command currently executed. If judging as no conflict, the newly inputted reset command is transmitted to a destination computer of the reset command, and then information of the transmitted reset command is stored as information of the reset command that is currently being executed. With this configuration, when one of the computers in which failure has occurred is reset by means of heartbeat mutual monitoring, it is possible to avoid a delay caused by a mutual reset or a repeated reset, and thereby to quickly reset the failed computer.

16 Claims, 12 Drawing Sheets

IBER (EXECUTING RESET INFORMATION BUFFER) — 0193

| SYSTEM ID (0211) | RESET ID OF A RESET COMMAND WHOSE SOURCE IS A SYSTEM SPECIFIED BY THE SYSTEM ID (0212) | RESET ID OF A RESET COMMAND WHOSE DESTINATION IS A SYSTEM SPECIFIED BY THE SYSTEM ID (0213) | GROUP ID (0601) |
|---|---|---|---|
| A | null | ID1 | GID_1 |
| B | ID1 | null | GID_1 |
| C | null | null | GID_1 |
| D | null | null | GID_2 |

IBER (EXECUTING RESET INFORMATION BUFFER)

| SYSTEM ID | RESET ID OF A RESET COMMAND WHOSE SOURCE IS A SYSTEM SPECIFIED BY THE SYSTEM ID | RESET ID OF A RESET COMMAND WHOSE DESTINATION IS A SYSTEM SPECIFIED BY THE SYSTEM ID | SYSTEM PRIORITY |
|---|---|---|---|
| A | null | ID1 | PRIORITY 1 |
| B | ID1 | null | PRIORITY 2 |
| C | null | null | PRIORITY 3 |
| D | null | null | PRIORITY 4 |

FIG. 12

STEP 0532

↓

1201 — DELETE A RESET COMMAND WHOSE RESET SOURCE SYSTEM, OR WHOSE RESET DESTINATION SYSTEM, IS EQUIVALENT TO A SOURCE SYSTEM OF THE COMPLETED RESET COMMAND FROM THE IBWR

↓

STEP 0533

FAILOVER METHOD IN A CLUSTER COMPUTER SYSTEM

CLAIM OF PRIORITY

The present application claims priority from Japanese application No. JP 2005-107019, filed on Apr. 4, 2005, the content of which is hereby incorporated by reference into this application.

CROSS-REFERENCE TO RELATED APPLICATION

The present application is related to U.S. application Ser. No. 11/065,352, filed on Feb. 25, 2005, entitled "Failover Method for A Cluster Computer System", the contents of which is hereby incorporated by reference into this application.

FIELD OF THE INVENTION

The present invention relates to a computer system with failure acceptability into which an application system is built, and more particularly to a computer system comprising: a program. having a system switching function of, if a failure occurs in an application program or an operating system of a computer in which the application program is being executed, switching the computer system to another computer system so that the execution of the application program is taken over by the latter computer system; and a device for controlling the priority of system switching instructions from the program.

According to the present invention, it is possible to prevent resetting from conflicting with another resetting, and from being repeated, without mutually adjusting the time required to issue a reset command between systems in the cluster computer system. This enables high-speed resetting and high-speed system switching. Therefore, it is expected that the present invention can be effectively made use of by a cluster computer system with high availability that can continue services even in the event of a failure.

BACKGROUND OF THE INVENTION

A computer system requiring high reliability is configured to include: an active system computer for executing processing (application); and a backup system computer that takes over the processing in the event in which a failure occurs in the active system. A procedure for, as a result of detecting a failure occurring in the active system, instructing the backup system to take over the processing is provided by a cluster program. In addition, if the application makes use of data on a disk, the disk is shared between the active system and the backup system. In order to configure the backup system to take over the processing in the event in which a failure occurs in the active system, it is necessary to determine a computer used as the backup system from among computers constituting a cluster, and to take over resources (shared resources) which cannot be used at the same time, for example, a shared disk and an IP address, among resources that are used by the application and an operating system (OS). Moreover, in order to achieve higher reliability, it is also necessary to ensure that even in the event of a failure in which a path used by the backup system to monitor a failure of the active system is interrupted (network split), the active system and the backup system do not use the shared resources at the same time.

Cluster programs in the cluster configuration often use a method in which a backup system used to take over processing is determined by exclusively taking over a shared disk. This method is proposed by, e.g., Japanese Patent Laid-open No. 10-207855 (patent document 1).

Japanese Patent Laid-open No. 10-207855 discloses a technology in which using a mechanism for causing a backup system to stop an active system, a cluster program of the backup system resets the active system to release shared resources possessed by the active system, and then the backup system possesses the released shared resources to exclusively control the shared resources.

According to the patent document 1, in the computer system having the cluster configuration, if the backup system cannot monitor the active system, the backup system achieves the exclusive control of the shared resources by stopping the active system. However, in a cluster constituted of two systems, each of which is a backup system for the other, if a network split occurs, both the systems try to reset each other. Therefore, there is a possibility that all the systems will be reset. Accordingly, if a network split occurs, processing is interrupted, and consequently the high availability cannot be achieved. This means that a problem of conflicting reset (mutual reset) arises.

In addition, although the backup system resets the active system, the active system never reset the backup system. Accordingly, in a case where there is a cluster constituted of an active system and two backup systems (a backup system 1 and a backup system 2) that are used to take over processing of the active system, if a network split causes the cluster to be separated into a cluster constituted of the active system and the backup system 1, and the backup system 2, the backup system 2 resets the active system to perform system switching. On the other hand, because the active system has been reset by the backup system 2, the backup system 1 also detects a failure of the active system, and consequently performs system switching. As a result, both the backup system 1 and the backup system 2 are switched to an active system at the same time, which causes duplicated accesses to the shared resources. In another case, the first reset causes the failed system to reset recovery processing again, which delays the recovery of the failed system. This means that a problem of another conflicting reset (repeated reset) also arises.

These problems of the conflicting reset and the repeated reset can be solved by controlling the order, in which reset commands are issued, so that cluster programs, each of which issues a reset command, do not issue a reset command to each other at the same time. However, in this solution is used, if a failure occurs in a system whose reset-issuance order is the highest, a delay for a fixed period of time is caused until a system having the second highest reset-issuance priority completes the reset. Thus, there was a problem of a delay in the system switching.

SUMMARY OF THE INVENTION

According to one aspect of the present invention, there is provided a high-availability computer system including a computer used as an active system and a computer used as a standby system, the active system and the standby system sharing at least one resource, the high-availability computer system comprising: a heartbeat path used by each of the computers to monitor a failure occurring in the other computer; a reset path used to stop each system; and a reset control unit that is connected to the reset path, wherein reset conflict is prevented to achieve high-speed system switching. For example, the shared resource is a disk unit.

According to the present invention, the computer system includes a reset control unit for controlling the issuance of a reset command by which each computer resets the other system. The reset control unit judges whether or not resetting conflicts with another resetting. In other words, the reset control unit checks the reset conflict relationship. For example, there is the relationship between systems that transmit/receive an issued reset command and another reset command currently being executed. In a source system from which a reset command has been issued, if reset is being executed by another reset command, the reset control unit prevents the newer reset command from being executed. In this way, in the situation in which both systems cannot monitor each other, both systems are disallowed to reset each other. As a result, it is possible to prevent failure in which no system can take over the processing. Additionally, in a destination system to which a reset command has been issued, if reset is being executed by another reset command, the reset control unit prevents the newer reset command from being executed. In this way, it is possible to prevent the same system from being reset multiple times.

If the reset is not prevented, the failure system is reset to stop the operation of the failure system so that the use of the shared resource is stopped. In this case, the operation may be stopped by, for example, turning the power off, or may also be stopped by shutting down the OS. In addition, by grouping systems capable of transmitting/receiving a reset command, it is possible to prevent an illegal reset command issued from a different group from being executed by mistake.

Moreover, on the basis of the priority of a system from which a reset command has been issued, a reset control unit may control the order in which reset commands are issued so as to prevent reset operation from conflicting with another. This is also a method that can be used. Here, the priority of a system needs only to use a value that is unique in the whole computer system. For example, a value that is given by the cluster program to the reset control unit may also be used; or an IP address of NIC used for a reset path may also be adopted.

Furthermore, when a reset conflict occurs, after the reset conflict is resolved, the reset control unit executes again a new reset command that causes the reset conflict. Thus, even if the execution of a reset command that is currently being executed fails, it is possible to reset the failure system, and thereby to achieve system switching.

By controlling reset commands in this manner in the computer system having the cluster configuration, it is possible to prevent a reset conflict from occurring. As a result, concurrently with detecting a failure system, each computer can execute a reset command. Accordingly, a high-availability system capable of quickly achieving system switching can be realized.

As a result of being able to issue a reset command without causing a reset conflict, it is possible to provide a high-availability computer system capable of achieving such system switching that only one system is reset even if a cluster program that has detected failure in an active system computer issues a reset command without delay.

BRIEF DESCRIPTION OF THE DRAWINGS

FIG. 12 is a process flowchart illustrating processing of deleting a waiting reset command that has been issued by a system that has been reset according to the fourth embodiment of the present invention;

DETAILED DESCRIPTION OF THE PREFERRED EMBODIMENTS

First Embodiment

It should be understood that diagrams and descriptions relating to embodiments of the present invention are simplified to illustrate minimum elements required for clear understanding of the present invention, and that known elements are therefore omitted within a range within which the present invention can be embodied without a hitch. In addition, among technologies relating to the embodiments, there are some technologies in which it is desirable and/or necessary to use other elements when implementing the present invention. However, these elements in the technologies are known, and do not facilitate the understanding of the present invention. Therefore, they will not be described here.

Figure 1:
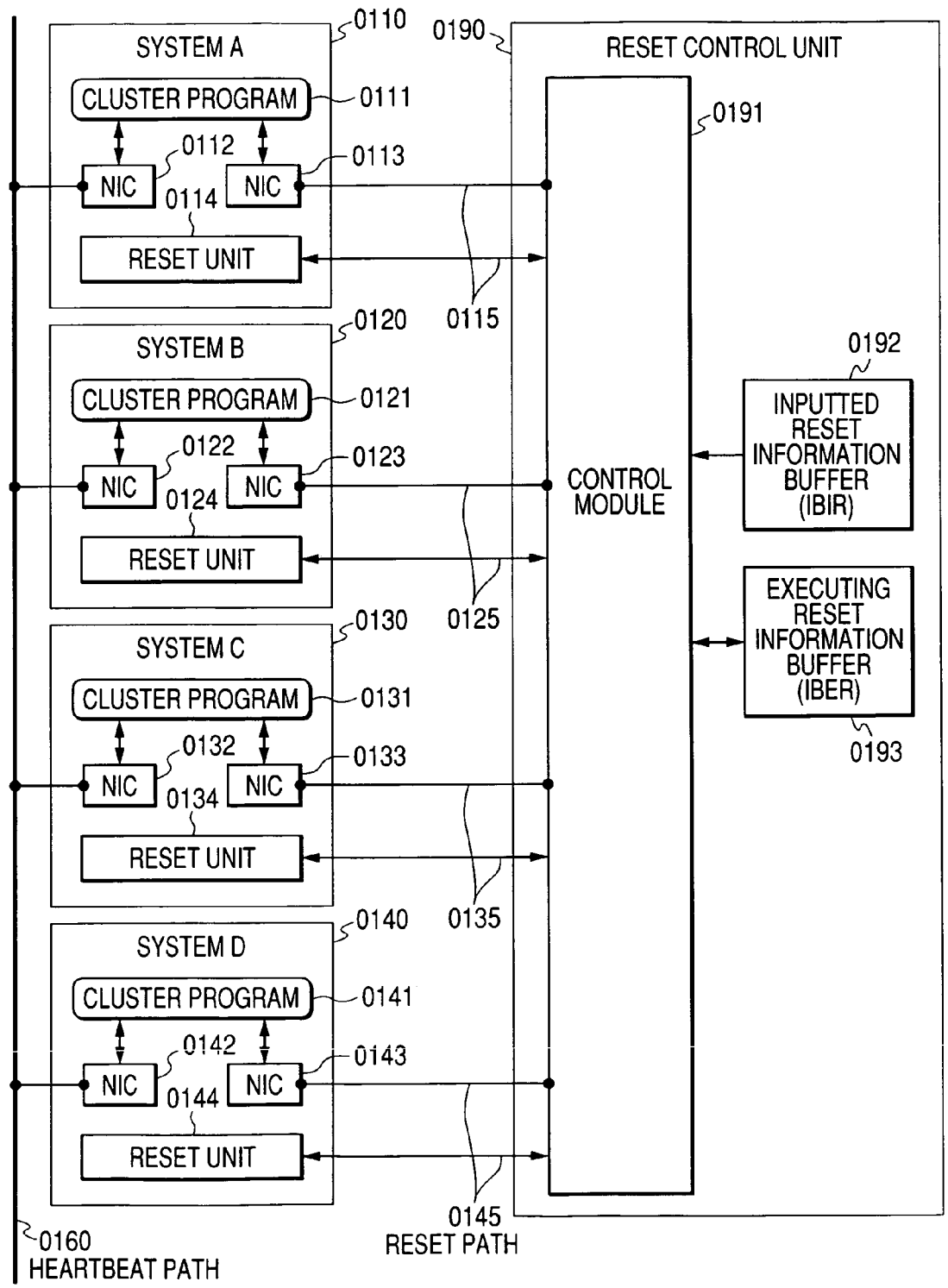
FIG. 1 is a high-level system block diagram illustrating a computer system model having a cluster configuration at the time of performing system switching according to a first embodiment of the present invention.

FIG. 1 is a system block diagram illustrating a high-availability computer system according to a first embodiment. Computers 0110, 0120, 0130, 0140 include cluster programs 0111, 0112, 0113, 0114, respectively. Accordingly, each of the computers can be used as an active system computer, and can also be used as a backup system computer for another system.

The computer 0110 (system A) comprises network adapters (NIC) 0112, 0113, which are means adapted to communicate with the outside. The NIC 0112 is connected to a heartbeat path 0160. To be more specific, this NIC 0112 is used for communications when the cluster program (0111) of its own system monitors a failure of the other computers through the heartbeat path 0160, and when the own system's cluster program (0111) notifies the other cluster programs of a failure of the own system. The NICs 0122, 0132, 0142, which are included in the other computers 0120, 0130, 0140 respectively, are also connected and used completely in the same manner. Another NIC 0113 is connected to a reset path 0115 that is connected to a reset control unit 0190. Each computer is provided with the reset control unit 0190 in common. To be more specific, on the assumption that, as a result of detecting a failure of any one of the computers, the own system's cluster program (0111) issues a reset command to the system in which the failure has occurred, the NIC 0113 is used for communications required to transmit the reset command to the reset control unit 0190. Here, although the NICs 0112, 0113 are configured independently of each other, they may also be configured as a single NIC having a plurality of ports. The NICs 0123, 0133, 0143, which are included in the other computers 0120, 0130, 0140 respectively, are also connected and used completely in the same manner.

Reset units 0114, 0124, 0134, 0144, which are included in the computers 0110, 0120, 0130, 0140, respectively, in the systems, each have a function of stopping its own system upon receipt of a reset signal from the reset control unit 0191 through reset paths 0115, 0125, 0135, 0145, respectively. More specifically, the reset unit stops the own system by temporarily turning the power off, by forcedly stopping OS (operating system), or by other means. Each of the cluster programs 0111, 0121, 0131, 0141 includes: a function of monitoring a state of its own system, and of notifying the other systems of the state through the NIC 0112 and the heartbeat path 0160; a function of monitoring states of the other systems, and of, when a failure occurs in one of the other systems, issuing a command for resetting the system in question; and a function of executing system switching processing by which processing of the system where the failure has occurred is taken over on the completion of the reset. The processing of the cluster programs 0111, 0121, 0131, 0141 will be further detailed later with reference to FIGS. 3 and 4.

The reset control unit 0190 comprises a reset control module 0191, an inputted reset information buffer (IBIR) 0192, and an executing reset information buffer (IBER) 0193. All reset commands issued by the cluster programs 0111, 0121, 0131, 0141 are transferred to the control module 0191 of the reset control unit. The control module 0191 carries out the arbitration of the reset command on the basis of the rest command issuance order, the priority of a system that has issued the reset command, a group to which the system belongs, or the like. To be more specific, if a reset signal is issued to a reset unit of a target computer to be reset, the subsequent control is carried out as follows. The issuance of a reset signal required by a newly inputted reset command is executed, kept in a waiting state, or stopped on the basis of the interrelationship with the reset command in question that is waiting for the completion of the reset (that is, the reset command is currently being executed). The inputted reset information buffer (IBIR) 0192 is a buffer for storing information about reset commands that have been inputted into the control module 0191 from the cluster programs of the systems. The executing reset information buffer (IBER) 0193 is a buffer for storing information about reset commands that have been issued to the reset units of the systems by the control module 0191.

Figure 2:
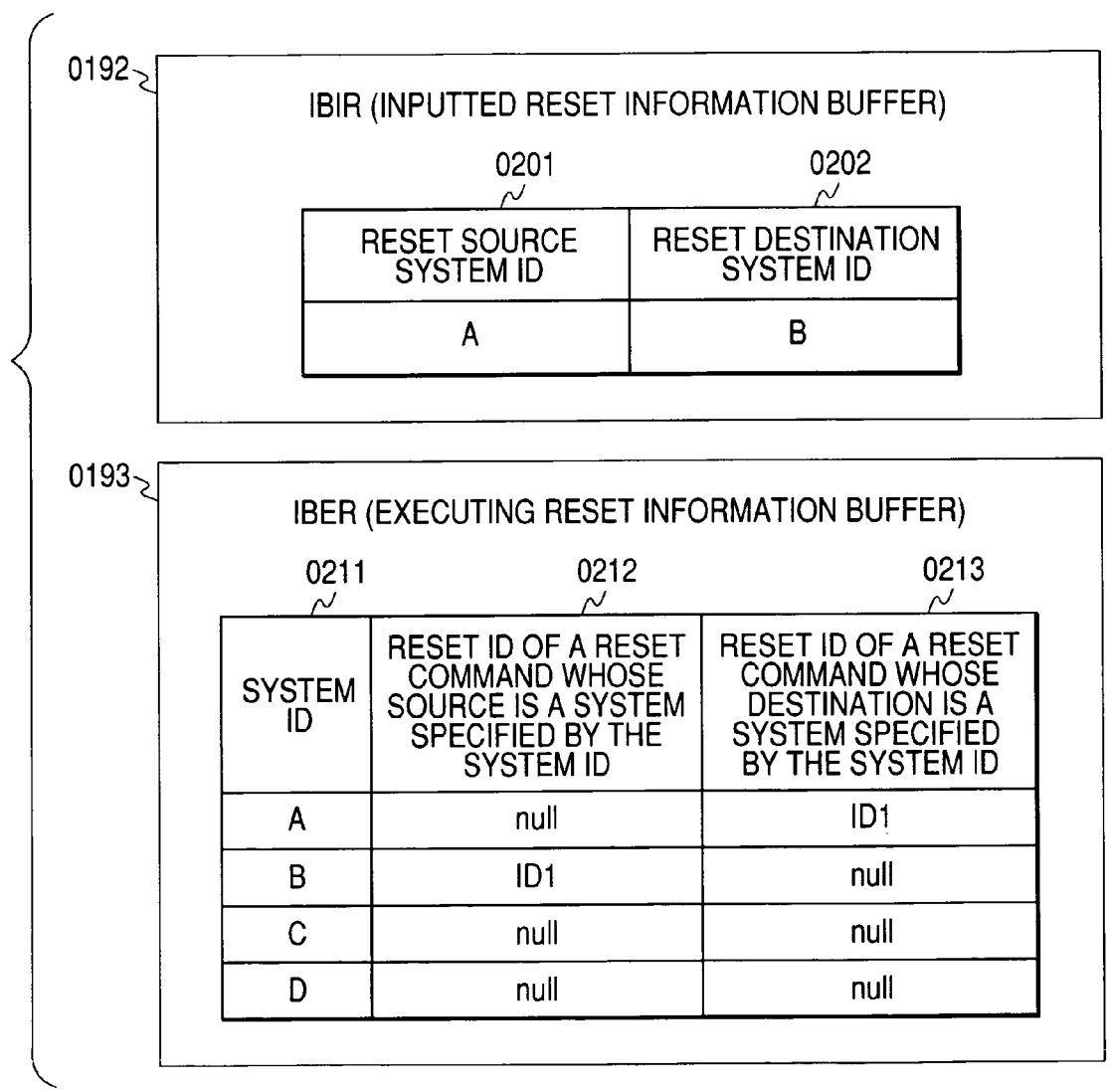
FIG. 2 is a diagram illustrating a configuration of a reset information buffer in a system switching control unit according to the first embodiment of the present invention.

FIG. 2 is a diagram illustrating information stored in the two buffers described above. The IBIR 0192 stores information about a reset command that is newly received by the control module 0191. The information includes the following:

(1) Reset source system ID 0201 which is an identifier for uniquely identifying a system of a cluster program that has issued the reset command; and (2) Reset destination system. ID 0202 which is an identifier for uniquely identifying a system reset by the reset command.

On the other hand, the IBER 0193 stores a table containing respective entries corresponding to all the systems operating under the control of the reset control unit 0190.

This table includes: a column 0211 in which a system ID for uniquely identifying each entry is stored beforehand; a column 0212 in which, as a result of transmitting from the control module a reset command whose source is a system specified by the system ID in the entry in question, a reset ID for uniquely identifying the reset command is stored; and a column 0213 in which, as a result of transmitting from the control module a reset command whose target to be reset is a system specified by the system ID in the entry in question, a reset ID for uniquely identifying the reset command is stored. According to the example shown in FIG. 2, a reset command whose name is ID1 has been issued from a system whose system ID is B, and is then transmitted to a system whose system ID is A, and is currently being executed.

Incidentally, each of the system IDs may also be, for example, information that is the same as information included in the reset command, or may also be a value into which the information included in the reset command is converted by use of a conversion table, which is included in the reset control unit 0190. Additionally, in this embodiment, although the same system is specified by the same system ID, the system may also be specified by a value into which another system ID is converted in like manner. Moreover, in this embodiment, although the number of inputted reset commands is one for the sake of easier understanding, a plurality of reset commands may also be handled at the same time. In this case, the IBIR 0192 keeps information about the plurality of reset commands in like manner.

Figure 3:
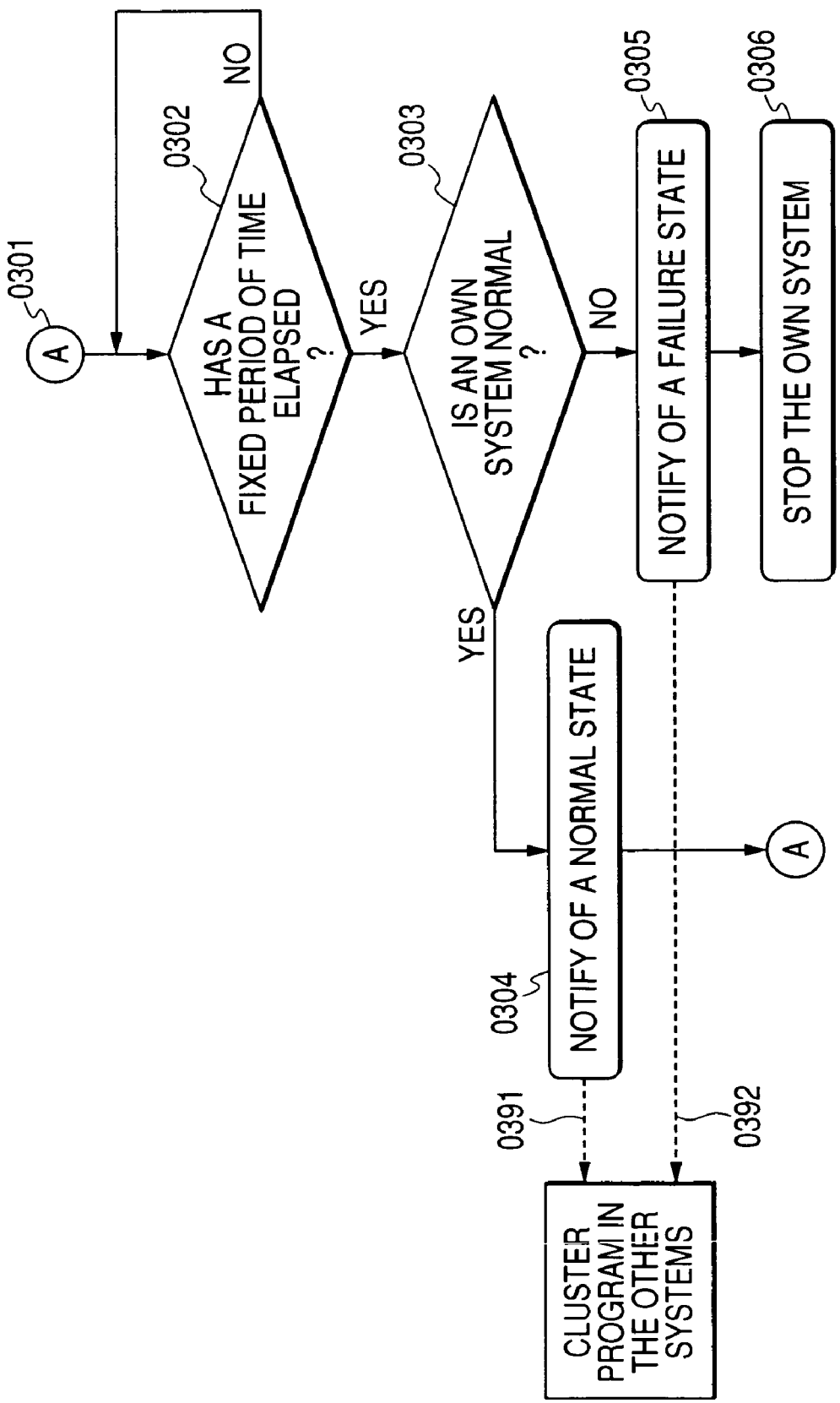
FIG. 3 is a process flowchart illustrating processing by which a cluster program transmits a state of its own system according to the first embodiment of the present invention.
Figure 4:
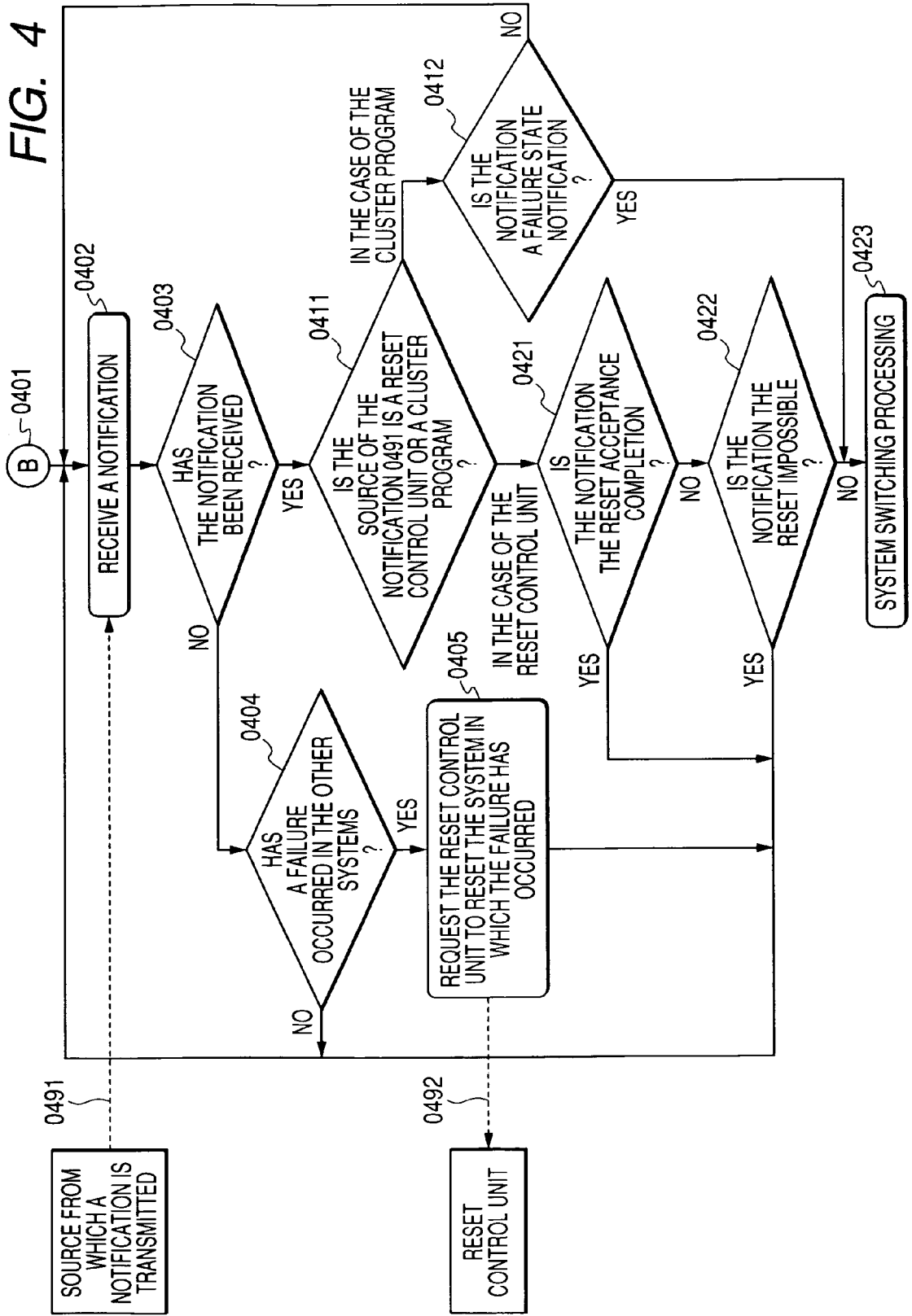
FIG. 4 is a process flowchart illustrating processing by which switching is performed between systems on the basis of contents of a notification received by a cluster program according to the first embodiment of the present invention.
Figure 5:
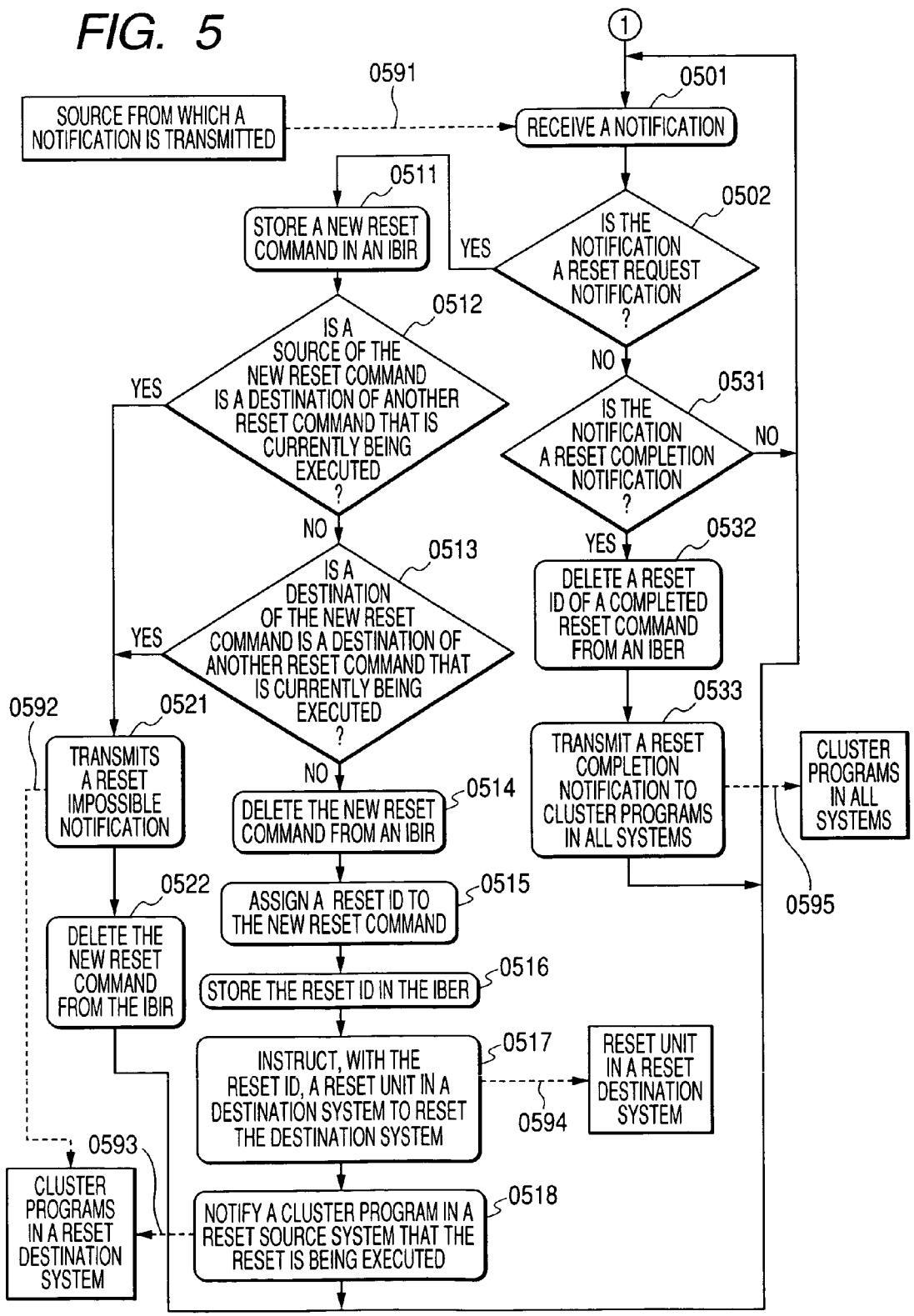
FIG. 5 is a process flowchart illustrating processing performed by a reset control unit according to the first embodiment of the present invention.

FIGS. 3 through 5 are flowcharts illustrating operation of the cluster program, and operation of the reset control unit, according to this embodiment.

First of all, FIG. 3 is a flowchart illustrating the operation flow in which each computer monitors a state of its own system by the cluster program to notify the cluster programs of the other systems of the own system's state.

In step 0301, monitoring of an own system is started. In step 302, a computer judges whether or not a fixed period of time has elapsed. If it is judged that the fixed period of time has not elapsed, step 0302 is repeated until the fixed period of time elapsed. If it is judged that the fixed period of time has elapsed, the computer checks whether or not its own system is normal (step 0303). If it is judged that the own system is normal, the computer transmits a notification of a normal state 0391 to the other cluster programs (step 0304). Then, the process returns to the own-system monitoring processing (step 0301) again. On the other hand, if it is judged that the own system is not normal, the computer transmits a notification of a failure state 0392 to the cluster programs of the other systems (step 0305), and then stops the own system in which a failure has occurred (step 0306). Here, stopping the own system in step 0306 needs only to perform processing that achieves the exclusive control of resources shared among the systems. Examples of the processing include stoppage of an application as a target of system switching control, and stoppage of the computer itself.

FIG. 4 is a flowchart illustrating the operation flow in which if a cluster program receives a notification from the outside, each computer judges the occurrence of failure to perform system switching.

In step 0401, processing of a notification received from the outside is started. First of all, in step 0402, the computer tries to receive a notification 0491 from the outside. In step 0403, the computer judges whether or not the notification 0491 has been received from an external source that transmits the notification 0491. If it is judged that the notification 0491 has not been received yet, the computer judges whether or not a fixed period of time has already passed since the last notification of normal states of the other systems, which means that failure has occurred (step 0404). In step 0404, if it is judged that failure has occurred, a reset command 0492 is issued to a system in which the failure has occurred (step 0405). Then, the process returns to step 0402 of receiving the notification again. In step 0404, if it is judged that a failure has not occurred, the process directly returns to step 0402 of receiving the notification.

On the other hand, in step 0403, if it is judged that the notification 0491 has been received, the computer further judges whether or not the source of the notification 0491 is a cluster program of another system, and whether or not the source is a reset control unit 0190 of its own system (step 0411). In step 0411, if it is judged that the source is a cluster program of another system, the computer judges whether or not the notification 0491 is a failure-state notification (the notification 0392 described in FIG. 3)(step 0412). If the notification 0491 is the failure-state notification, the computer executes system switching processing (step 0423). If the notification 0491 is not the failure-state notification, nothing is executed because the notification 0491 is a normal-state notification (the notification 0391 described in FIG. 3). Then, the process returns to the notification receive processing 0402 again.

In step 0411, if it is judged that the source is a reset control unit, the computer judges whether or not the notification 0491 is a response of the acceptance completion of a reset command, the response having been issued from another system (a notification 0593 described later) (step 0421). If the computer judged that the notification 0491 is the response of the acceptance completion, the process returns to step 0402 of notification receipt so that a subsequently arriving reset completion notification may be received. On the other hand, in step 0421, if it is judged that the notification 0491 is not the response of the acceptance completion, the computer further judges whether or not the notification 0491 is a response of acceptance impossible (a notification 0592 described later) (step 0422). If it is judged that the notification 0491 is acceptance impossible, this shows that a higher priority is assigned to a reset command of another system than to the reset command in question. Accordingly, nothing is executed, and then the process returns to step 0402 of notification receipt. Moreover, in step 0422, if it is judged that the notification 0491 is not acceptance impossible, the notification 0491 is a notification that the reset command 0492 has been completed (a notification 0594 described later). Accordingly, the computer executes the system switching processing in step 0423.

FIG. 5 is a flowchart illustrating how the control module 0191 operates using the buffers IBIR 0192, IBER 0193.

First of all, the control module 0191 receives a notification from the outside (step 0501). Next, the module 0191 judges whether or not the received notification is a reset request notification that has been transmitted by a cluster program through a reset path (the reset command 0492 shown in FIG. 4) (step 0502). If the received notification is the reset request notification, the module 0191 executes processing in step 0511. If the received notification is not the reset request notification, the module 0191 executes processing in step 0531. In step 0511, the module 0191 stores, in the buffer IBCR0192, a system ID 0201 of a source system, and a system ID 0202 of a target system to be reset. Subsequently, in step 0512, the module 0191 judges whether or not a source of the reset command 0492 is a destination of another reset command that is currently being executed. To be more specific, the module 0191 checks whether or not a reset ID is stored as an entry in the column 0213 included in the buffer IBER 0193, the entry corresponding to a value of the reset source system ID 0201. If the reset ID is stored, a source of the new reset command is currently being reset; that is to say, the reset is being executed. If the reset ID is not stored (a null state), the reset is not executed.

In step 0512, if a source of the new reset command 0492 is currently being reset, the module 0191 transmits a reset impossible notification (notification 0592) to the cluster program, which is the source of the new reset command 0492, so as to prevent both systems from mutually resetting each other (step 0521). After that, the module 0191 deletes the system IDs 0201, 0201 stored in the IBIR 0192 (step 0522), and then returns to the notification receipt processing (step 0501) again.

On the other hand, if the source of the new reset command 0492 is not a destination of a reset command that is currently being executed (No in step 0512), then the module 0191 judges whether or not a destination of the new reset command is a destination of another reset command that is currently being executed (step 0513). To be more specific, the module 0191 checks whether or not a reset ID is stored as an entry in the column 0213 included in the IBER 0193, the entry corresponding to the reset destination system ID 0202 of the new reset command. If the answer is Yes in step 0513, in other words, if a destination of the new reset command is currently being reset, the module 0191 transmits a reset impossible notification to prevent reset from being repeated (step 0521), and then deletes the new reset command from the IBIR 0192 (step 0522). Incidentally, if Yes in step 0512, because another reset command is currently being executed in a system that is notified of reset impossible in step 0521, the reset impossible notification in step 0521 may also be omitted.

Also in step 0513, if the answer is No, a new reset command can be executed. Therefore, first of all, the reset source system ID 0201 and the reset destination system ID 0202 are deleted from the IBCR 0192 (step 0514). Next, the module 0191 assigns a new reset ID to the new reset command (step 0515). Then, the module 0191 stores the new reset ID as an entry both in the column 0212 included in the IBER 0193, the entry corresponding to the deleted reset source system ID 0201, and in the column 0213 included in the IBER 0193, the entry corresponding to the deleted reset destination system ID 0202 (step 0516). After that, the module 0191 transmits a reset command through a reset path to a reset unit in a system identified by the deleted reset destination system ID 0202 (notification 0594). In other words, the module 0191 instructs the execution of the reset in the system (step 0517). Moreover, the module 0191 transmits a notification that the reset is being executed (notification 0593) to a cluster program in a system identified by the reset source system ID 0201, the system being a source of the reset command, the execution of which has been started. Then, the process returns to step 0501 of notification receipt again. Incidentally, in the operation flow of the cluster program described with reference to FIG. 4, this notification 0593 corresponds to the notification 0491 received from the outside of the cluster program. More specifically, the processing described in step 0402 is performed in the cluster program. In addition, a reset unit in a system to which a reset command (the notification 0594) is transmitted from the reset control unit 0190 resets a computer of its own system, and then transmits a reset completion notification to the reset control unit 0190 through a reset path (0115, 0125, 0135, or 0145).

In step 0502, if it is judged that the received notification is not the reset request notification, the control module 0191 further judges whether or not the received notification is a reset completion notification from the reset unit (step 0531). If the received notification is not the reset completion notification, the received notification is not a notification that is handled by the control module 0191. Accordingly, the process returns to step 0501 of notification receipt again. On the other hand, if the received notification is the reset completion notification, the control module 0191 deletes a reset ID of the completed reset command from the column 0212 and column 0213 of the buffer IBER 0193 (step 0532). After that, a notification that a system corresponding to an entry of the column 0213, to which the reset ID is written, has been reset is transmitted to the cluster programs of all systems except the system that has been reset (notification 0595 in step 0533). Then, the process returns to step 0501 of notification receipt again.

In the embodiment described above, it is possible to prevent a source and a destination of a reset command from being reset at the same time (mutual reset). Moreover, even if a plurality of reset commands are issued to the same system, it is possible to prevent a system whose reset has been completed from being reset again, and thereby to avoid an increase in recovery time taken until the completion of restarting (repeated reset). Furthermore, without being conscious of the mutual reset and the repeated reset, the cluster program can reset a system without delay after detection of failure, and accordingly it is possible to realize a high-speed cluster system with high reliability.

Second Embodiment

Figures 6, 7:
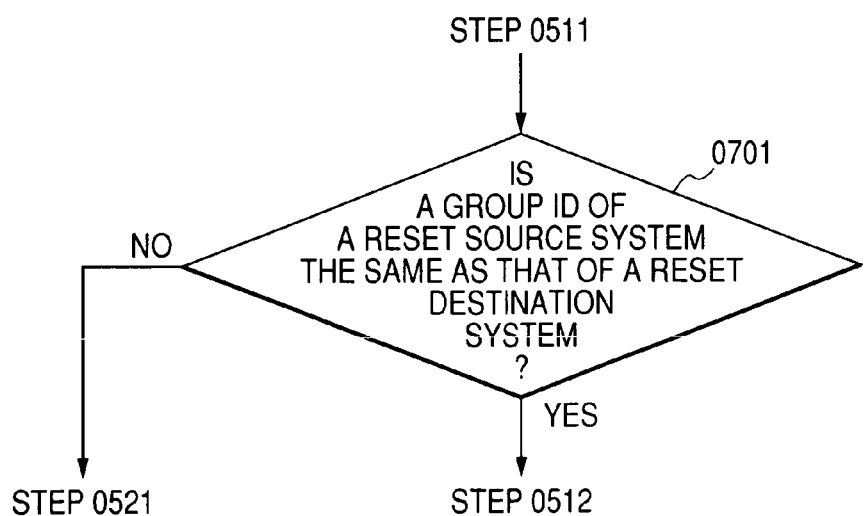
FIG. 6 is a diagram illustrating a configuration of a reset information buffer in a reset control unit according to a second embodiment of the present invention.
FIG. 7 is a process flowchart illustrating processing performed by a reset control unit according to the second embodiment of the present invention.

FIGS. 6 and 7 are diagrams each illustrating a second embodiment.

In this embodiment, a configuration of a table stored in the executing reset information buffer IBER 0193, which is managed and used by the control module 0191 of the reset control unit 0190, is different from that of the first embodiment. In the second embodiment, FIG. 6 illustrates a table stored in the IBER 0193. In addition to the same columns 0211, 0212, 0213 as those included in the table in the first embodiment (refer to FIG. 2), the table in the second embodiment has a column 0601 for storing a group ID that identifies a group to which a system corresponding to each entry of the table belongs. For example, each of the cluster programs notifies the control module 0191 of a group ID of its own system through each reset path so that the group ID is stored in the IBER 0193 beforehand.

In this embodiment, if group IDs are the same, in other words, if systems belong to the same group, the systems are allowed to reset one another. Systems belonging to groups that differ from one another are disallowed to reset one another. FIG. 7 is a flowchart illustrating the above operation. FIG. 7 illustrates only an additional step 0701 that is inserted into the operation flow (FIG. 5) of the control module in the first embodiment described above. After the control module 0191 receives a new reset command (notification 0492), the control module 0191 stores the new reset command in the IBIR 0192 in step 0511. Next, the control module 0191 executes processing in step 0701. In step 0701, the control module 0191 compares a group ID of a system identified by the reset source system ID 0201 with a group ID of a system identified by the reset destination system ID 0202 with reference to the column 0601 in the IBER 0193. If the group IDs are not the same, both systems are not allowed to reset each other. Accordingly, processing in step 0521 and the subsequent steps in FIG. 5 is performed, that is, transmitting a reset impossible notification and subsequent processing are carried out. If the group IDs are the same, both systems are allowed to reset each other. Accordingly, the processing in step 0512 and the subsequent steps is performed.

In the second embodiment described above, only when the source from which the reset command has been issued and the destination to which the reset command has been issued belong to the same group, both systems are allowed to be reset. As a result, even if the cluster program improperly operates, or even if a reset command is transmitted from the outside of the cluster with malicious intent, it is possible to prevent a system from being reset by mistake, and accordingly it is possible to realize a cluster system with high reliability.

Incidentally, an effect of using the group ID can be produced regardless of whether or not to judge the occurrence of a reset conflict with a reset command that is currently being executed, which is the characteristic of the first embodiment. More specifically, instead of using the operation flow in the second embodiment, even if the undermentioned operation flow is adopted, the effect of using the group ID is produced. That is to say, if the answer is Yes in step 0701 shown in FIG. 7, the process proceeds to step 0514 in FIG. 5.

Third Embodiment

Figures 8, 9:
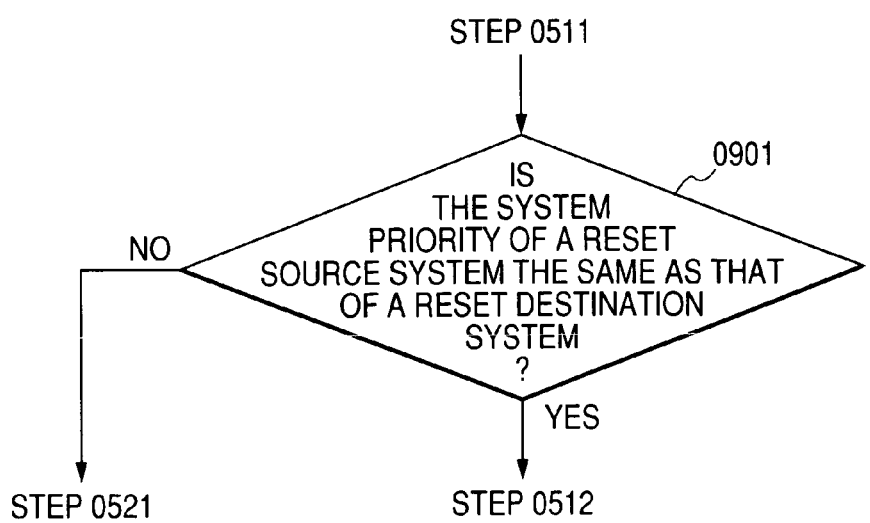
FIG. 8 is a diagram illustrating a configuration of a reset information buffer in a reset control unit according to a third embodiment of the present invention.
FIG. 9 is a process flowchart illustrating processing performed by a reset control unit according to the third embodiment of the present invention.

FIGS. 8, 9 are diagrams each illustrating a third embodiment.

In this embodiment, FIG. 8 is a diagram illustrating a structure of a table stored in the IBER 0193. In addition to the same columns 0211, 0212, 0213 as those included in the table in the first embodiment (refer to FIG. 2), the table has a column 0801 for storing the system priority. The system priority is an identifier for indicating the priority of a reset command issued by a corresponding system. A system whose priority is higher has a function of disallowing reset by a system whose priority is lower. System priority can be stored in the table by, for example, allowing the cluster program to notify the reset control unit of the system priority through the reset path.

FIG. 9 is a flowchart illustrating part of operation flow of the control module according to the third embodiment. More specifically, FIG. 9 illustrates only an additional step 0901 that is inserted into the operation flow (in FIG. 5) of the control module in the first embodiment described above. After the control module 0191 receives a new reset command (the notification 0492), the control module 0191 stores the new reset command in the IBIR 0192 in step 0511. Next, the control module 0191 executes processing in step 0901. Instep 0901, the control module 0191 compares the system priority of a system identified by the reset source system ID 0201 with the system priority of a system identified by the reset destination system ID 0202 with reference to the column 0801 of the IBER 0193. If the system priority of the system identified by the reset source system ID 0201 is lower than that of the system identified by the reset destination system ID 0202, the processing of transmitting a reset impossible notification (step 0521) and the subsequent processing are performed. On the other hand, if the system priority in question is higher, resetting by the new reset command is allowed. Accordingly, the processing in step 0512 and the subsequent processing are performed.

In this embodiment, by giving higher priority to a system that performs important processing, it is possible to prevent the system with higher priority from being reset by a system with lower priority. Accordingly, a cluster system with high reliability can be realized.

The above effect obtained by using the system priority can be produced regardless of whether or not to judge the occurrence of a reset conflict with a reset command that is currently being executed, which is the characteristic of the first embodiment. More specifically, instead of using the operation flow in the third embodiment, even if the undermentioned operation flow is adopted, the effect obtained by using the system priority is effectively produced. That is to say, if the answer is Yes in step 0901 shown in FIG. 9, the process proceeds to step 0514 in FIG. 5.

Fourth Embodiment

Figure 10:
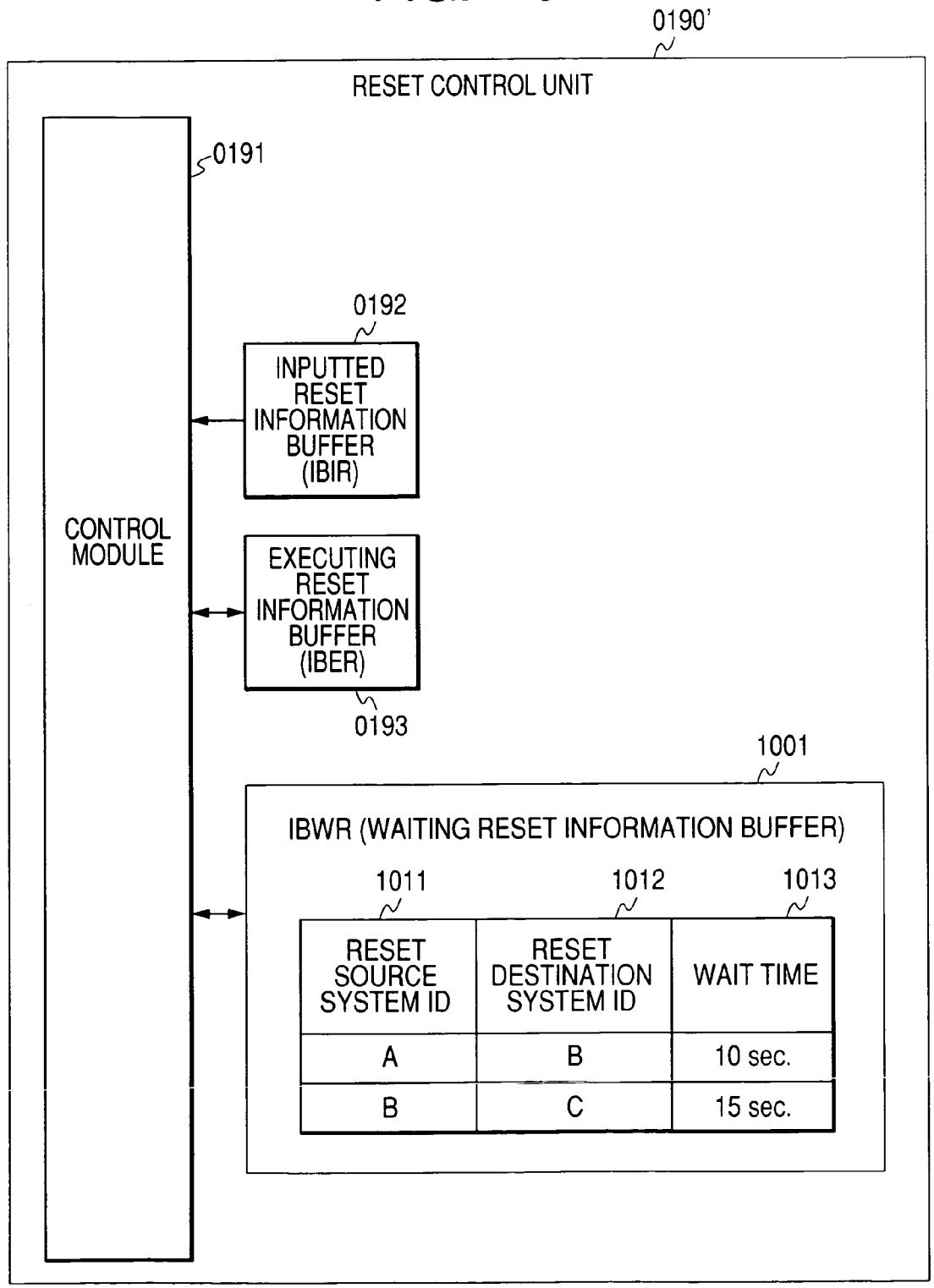
FIG. 10 is a diagram illustrating a configuration of a reset information buffer in a reset control unit according to a fourth embodiment of the present invention.
Figure 11:
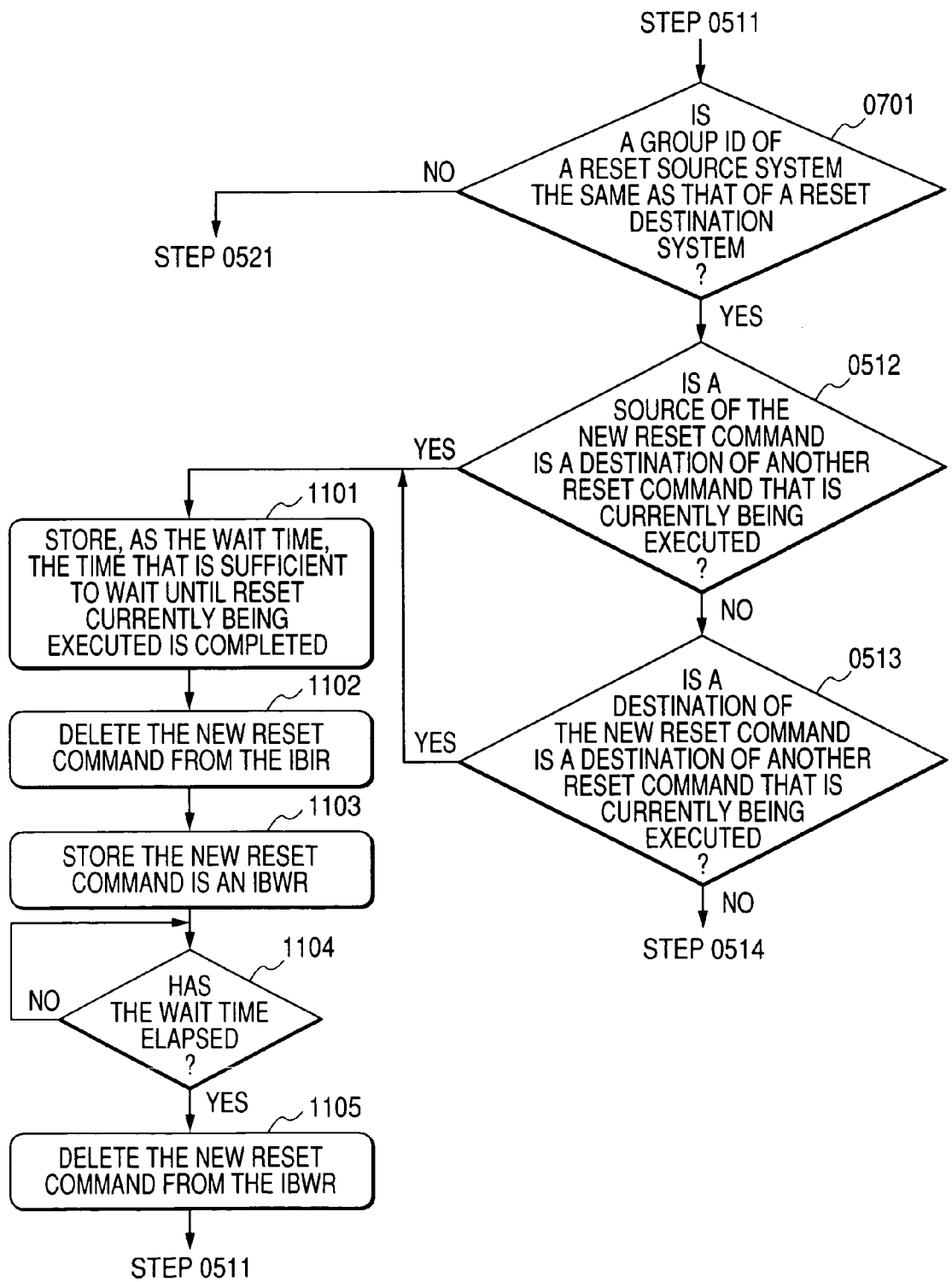
FIG. 11 is a process flowchart illustrating processing performed by a reset control unit according to the fourth embodiment of the present invention.

FIGS. 10, 11 and 12 illustrate a fourth embodiment in which instead of notifying the cluster program of reset impossible, the reexecution of a reset command is controlled in the reset control unit.

FIG. 10 is a diagram illustrating a configuration of a reset control unit 0190' according to this embodiment. This reset control unit 0190' is different from the reset control unit 0190 according to the first embodiment (shown in FIG. 2) in that it further comprises a waiting reset information buffer (IBWR) 1001. For each reset command whose issuance to a reset unit in each system is brought into a waiting state, the waiting reset information buffer IBWR 1001 stores three kinds of information as follows:

(1) Reset source system ID 1011 which is an identifier for uniquely identifying a system of a cluster program that has issued a waiting reset command;

(2) Reset destination system ID 1012 which is an identifier for uniquely identifying a system that is reset by a waiting reset command; and (3) Wait time 1013 for specifying the length of time during which a waiting reset command is waiting for the issuance thereof.

FIGS. 11 and 12 are flowcharts each illustrating the operation flow of a control module 0191 of the reset control unit 0190' according to this embodiment.

FIG. 11 illustrates the operation flow in which a reset command is kept in a waiting state in the IBWR until the reset command is reissued. This operation flow is added to the operation flow in FIG. 5 as changed part. The control module 0191 stores a new reset command in the IBIR 0192 in step 0511, and then judges, in step 0701, whether or not a source from which the reset command has been issued and a destination to which the reset command has been issued belong to the same group. This step is the same as the second embodiment. If both systems do not belong to the same group, the process proceeds to step 0521 in FIG. 5 where a reset impossible notification is transmitted to the cluster program of the source. If both systems belong to the same group, the process proceeds to step 0512 and step 0513. In step 0512, if it is judged that a source from which a new reset command 0492 has been issued is a target of a reset command that is currently being executed, or in step 0513, if it is judged that a destination to which the new reset command has been issued is a target of a reset command that is currently being reset, instead of transmitting a reset impossible notification in step 0521, processing in step 1101 is executed. In step 1101, the wait time 1013 of the new waiting reset command is stored in the IBWR 1001.

To be more specific, the delay time which is sufficient to wait until a reset command currently being executed is completed (if such a reset command exists) is defined in the reset control unit beforehand. In this case, the reset command currently being executed is in a mutual reset relationship with, or in a repeated reset relationship with, the new reset command. In step 1101, the wait time 1013 is stored in the IBWR 1001 as the delay time. Subsequently, in step 1102, the new reset command 0492 is deleted from the IBIR 0192. Then, in step 1103, the reset command that has been deleted from the IBWR 1001 is stored as a waiting reset command.

To be more specific, the system IDs 0201, 0202 stored in the IBIR 0192 are stored as the reset source system ID 1011 and the reset destination system ID 1012, respectively, of the waiting reset command. In step 1104, a judgment is made as to whether or not the wait time 1013 has already elapsed. If the wait time 1013 has not elapsed, waiting is continued (step 1104). On the other hand, if the wait time 1013 has already elapsed, the reset command whose wait time has ended is deleted from the IBWR 1001 (step 1105). Then, the process returns to step 0511 (in FIG. 5) so that the reset command deleted in step 1105 is executed again. In other words, the waiting reset command is stored in the IBCR 0192 again as a new reset command, and the above processing is repeated.

In this embodiment, there is a case where a completed reset command may reset a source or a destination of a waiting reset command. In this case, it is not necessary to call again a reset command that has been brought into a waiting state. FIG. 12 illustrates an additional step that is required for the above reason. The control module 0191 receives a reset completion notification, and deletes a reset ID of the reset command from the IBER in step 0532 (in FIG. 5). After that, processing in step 1201 is executed. In step 1201, a reset command is deleted from the IBWR 1001. More specifically, as a result of deleting the reset ID from an entry of the column 0213 in the IBER, if a system ID corresponding to the deleted reset ID (i.e., a system ID of a system that has been reset) is the same as a system ID stored in the reset source system ID 1011 or that stored in the reset destination system ID 1012 in the IBWR 1001, a corresponding reset command having the system ID in question in the reset source system ID 1011 or in the reset destination system ID 1012 is deleted from the IBWR 1001. After that, the process returns to the execution completion flow (step 0533) of a usual reset command.

In addition, the above-mentioned fourth embodiment may also be modified. More specifically, as is the case with the third embodiment, a judgment as to whether or not to reset a system may also be made on the basis of the system priority. In this case, for example, the processing in step 0701 shown in FIG. 11 is executed not after step 0511 but after step 0901 (in FIG. 9).

In the fourth embodiment, if a reset command which conflicts with a new reset command has already entered an execution stage, instead of returning a reset impossible notification to a source from which the new reset command has been issued, the new reset command is brought into a waiting state, and then a judgment is made again. In other words, if the execution of the reset command which conflicts with the new reset command fails, a failure system is immediately reset by the new reset command that is kept in a waiting state. Therefore, it is possible to realize a cluster system with higher reliability.

Fifth Embodiment

Figure 13:
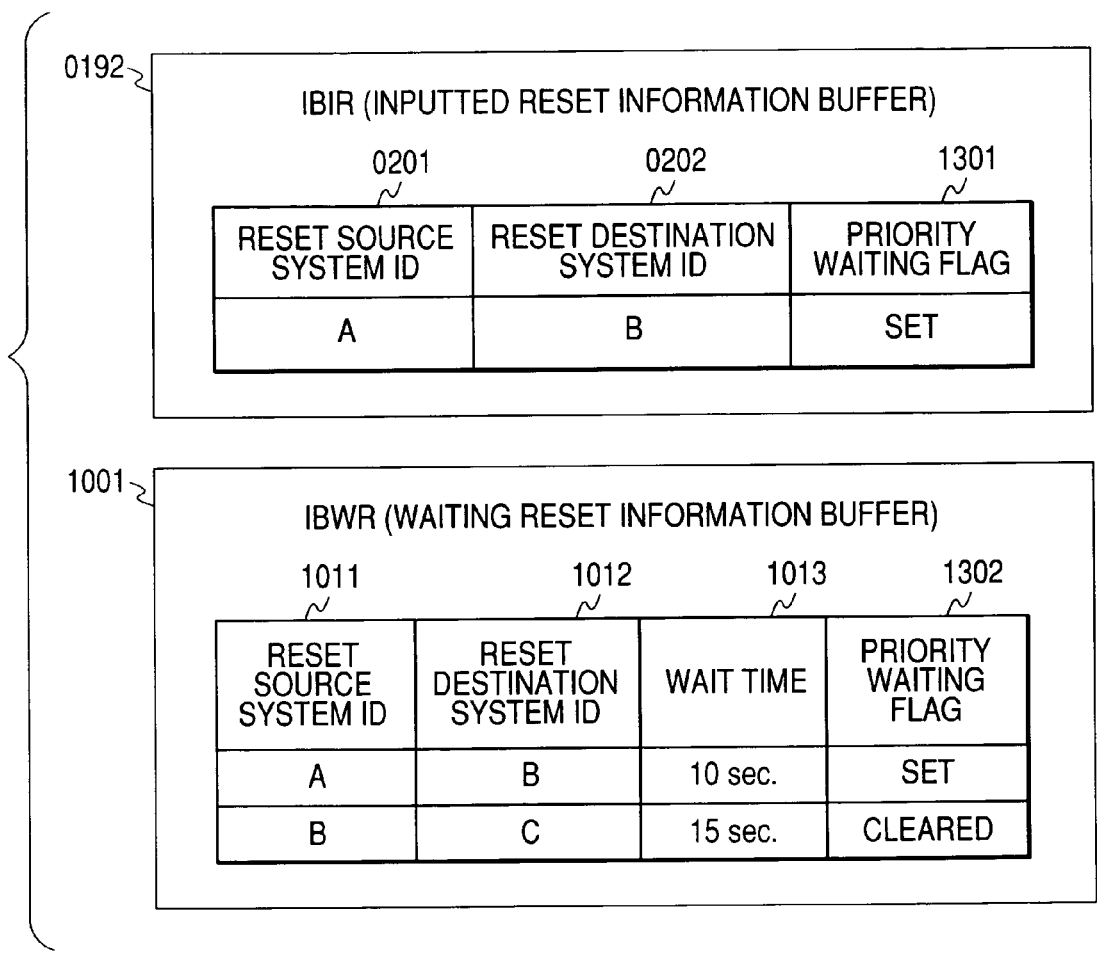
FIG. 13 is a process flowchart illustrating processing of deleting a waiting reset command that has been issued by a system that has been reset according to a fifth embodiment of the present invention.
Figure 14:
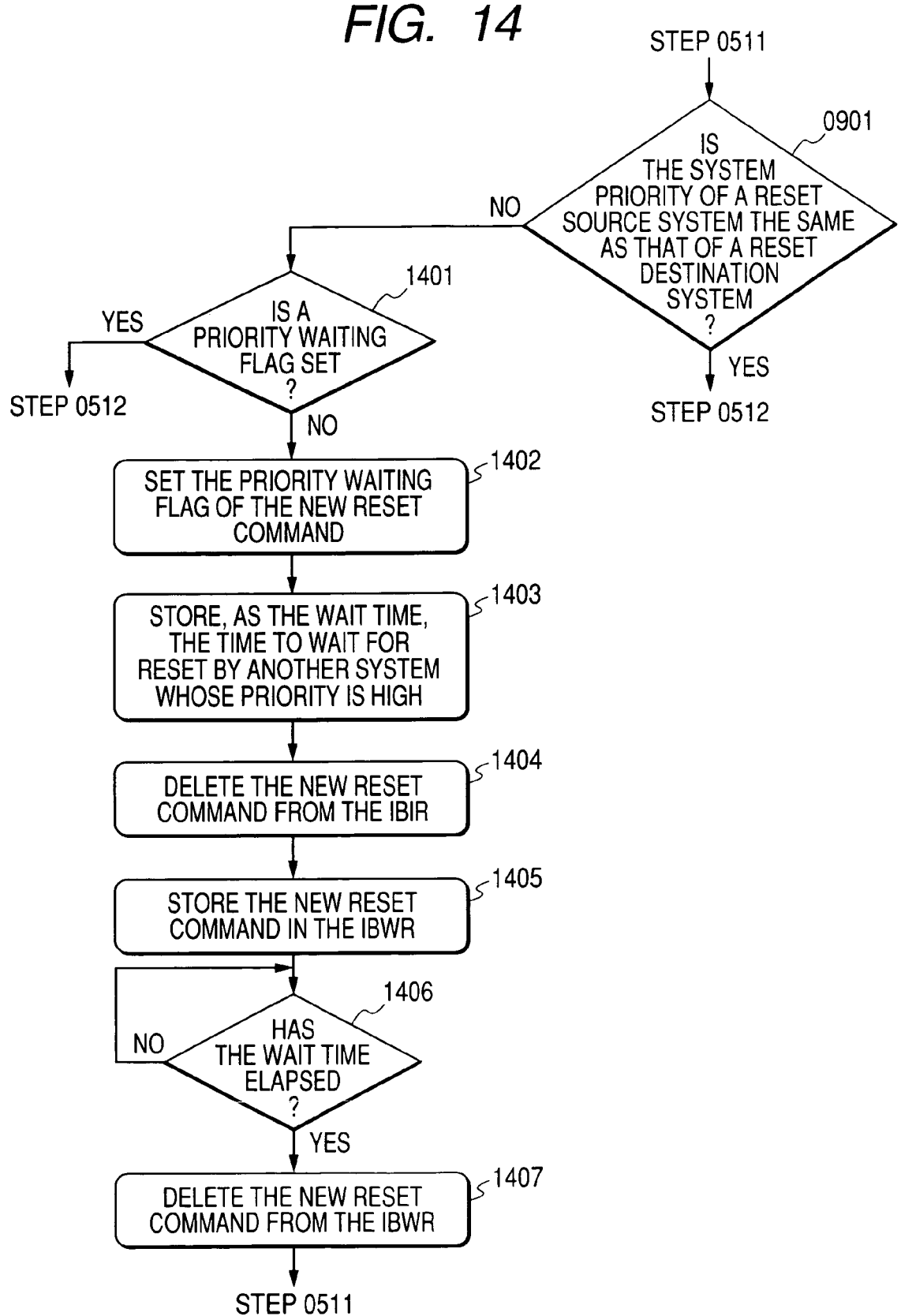
FIG. 14 is a process flowchart illustrating processing performed by a reset control unit according to the fifth embodiment of the present invention.

FIGS. 13 and 14 illustrate a fifth embodiment in which, instead of disallowing a system whose system priority is lower to reset a system whose system priority is higher, if such a reset command is inputted, the reset command is kept in a waiting state until the wait time elapses whose length is sufficient to be reset by another system whose system priority is higher.

Since the system priority is used in the fifth embodiment, a table stored in the executing reset information buffer IBER is configured in a manner similar to that in the third embodiment. Accordingly, the table in the fifth embodiment has a configuration as shown in FIG. 8. Since the present embodiment also keeps a reset command in a waiting state, the reset control unit 0190' shown in FIG. 10 is used.

FIG. 13 is a diagram illustrating information stored in the inputted reset information buffer IBIR 0192 and in the waiting reset information buffer IBWR 1001, the information being used in the fifth embodiment. Not only the reset source system ID 0201 and reset destination system ID 0202 of an inputted reset command, but also a priority waiting flag 1301 is stored in the IBIR 0192. The priority waiting flag 1301 indicates whether or not the inputted reset command is a reset command that is brought into a waiting state so as to wait for reset with high priority. Moreover, also for each of reset commands that are waiting in the IBWR 1001, in addition to the information described in FIG. 10, the priority waiting flag 1302 which is the same as the above is stored.

FIG. 14 is a flowchart illustrating the operation flow of the control module 0191 in this embodiment. However, FIG. 14 illustrates only the changed part of the operation flow shown in a FIG. 5. Moreover, the operation flow of this embodiment also includes the changed parts described in FIGS. 11 and 12 just as they are.

On receipt of a new reset command, or the like, the control module 0191 stores the reset command in the IBIR 0192 in step 0511 (in FIG. 5). Next, the process proceeds to step 0901 in FIG. 14 where the control module 0191 compares between the priority of a source from which the reset command has been issued and that of a destination to which the reset command has been issued. A specific comparison method is the same as that described in the third embodiment with reference to FIG. 9. If the priority of the destination is higher than that of the source, processing in step 1401 is executed. In step 1401, a judgment is made as to whether or not the priority waiting flag 1301 in the IBIR 0192 is set. The priority waiting flag 1301 in the IBIR 0192 which is not set means that the reset command enters a waiting state (priority waiting) for the first time to wait for reset by another system whose priority is higher. Accordingly, the priority waiting flag 1301 is set in the IBIR 0192 (step 1402).

Next, in step 1403, the wait time 1013 (in FIG. 13) of the reset command to be newly stored in the IBWR 1001 is set. To be more specific, the delay time is set in the reset control unit beforehand. Here, the length of the delay time is sufficient for a system that needs to be reset by a reset command from a system whose priority is low to be reset by another system whose priority is higher. Instep 1403, the delay time is stored in the IBWR 1001 as the wait time 1013 (FIG. 13) of a reset command that is stored in the IBWR 1001 from now. Next, in step 1404, a reset command is deleted from the IBCR 0192. Then, in step 1405, the deleted reset command is stored in the IBWR 1001. Since the priority waiting flag 1301 in the IBIR 0192 is set, the priority waiting flag 1302 corresponding to the stored reset command is also set. If it is judged that the wait time has already elapsed (step 1406), the reset command that has been brought into a waiting state is deleted from the IBWR 1001 (step 1407), and then the process returns to step 0511 where the reset command is judged again. At this time, since a value of the priority waiting flag 1302 stored in the IBWR 1001 is also stored in the IBIR 0192 just as it is, the priority waiting flag 1301 of the reset command in the IBIR 0192, which is used when a judgment is made again, is kept in a set state (set).

In step 1401, if the priority waiting flag 1301 in the IBIR 0192 is set, the process proceeds to the processing in step 0512 (in FIG. 11). To be more specific, since the conditions are not met that the priority of a source system from which the reset command has been issued is higher than that of a destination system to which the reset command has been issued, the reset command that is kept in a waiting state in the reset control unit may be subjected to a judgment as to whether or not to be executed. In this case, instead of bringing the reset command in question into a waiting state again so as to wait for resetting by a system whose priority is higher, the reset processing is executed. In step 0901, also if the priority of the system from which the new reset command to be judged has been issued is higher than the priority of the destination system, the process directly proceeds to step 0512 where the reset processing is performed in a manner similar to that in the third embodiment.

Since the processing in step 0512 and in the subsequent steps follow the operation flow shown in FIG. 12, a judgment as to whether or not the reset command causes the mutual reset or the repeated reset, which were described in the first embodiment, is also made in the fifth embodiment (namely, a reset conflict judgment). Here, if it is judged that a "conflict" occurs, the process proceeds to step 1101 and beyond in FIG. 11. In other words, as is the case with the third embodiment, the reset command is brought into a waiting state on the basis of the result of the reset conflict judgment, and is accordingly stored in the IBWR. Therefore, in the fifth embodiment, there are two kinds of reset commands that are waiting in the IBWR 1001: a reset command that is brought into a waiting state so as to wait for a reset command whose priority is high as described above; and a reset command that is brought into a waiting state to avoid the conflicting reset. The latter reset command does not cause the priority waiting flag 1302 to be set. More specifically, this priority waiting flag adopted in this embodiment has a function of identifying each of the two kinds of the waiting reset commands.

In addition, the operation flow of the reset control module 0191 according to the fifth embodiment includes the additional step 1201 shown in FIG. 12. To be more specific, as a result of transmitting a reset command to a reset control unit of a target system to be reset, if a reset completion notification is received, the processing in step 1201 shown FIG. 12 is executed subsequently to step 0532 in FIG. 5. More specifically, from among the reset commands that are kept in a waiting state in the IBWR 1001, a reset command whose destination or source is a system, the reset of which has already been completed, is deleted from the IBWR 1001 (that is to say, a reset command that conflicts with the completed reset operation is deleted).

In the fifth embodiment described above, a judgment as to whether or not to reset is made on the basis of the priority of systems. At the same time, a reset command issued from a system whose priority is low to a system whose priority is high is brought into a waiting state in which the wait time is sufficiently provided. If reset in a reverse direction has not been executed even after the lapse of the wait time, the reset is executed. Therefore, resetting and system switching are reliably and certainly performed between systems in a computer system having a cluster configuration.

In the embodiments described above, the computer system having the cluster configuration in which the number of reset control units is one has been described. However, the present invention can also be applied in like manner to even a computer system having a cluster configuration in which the number of reset control units is two or more. In this case, it is possible to embody the present invention by synchronizing the buffers of the reset control units with one another.

Moreover, although the reset control module was assumed to be a module on a reset control unit, it may also be a program that operates on a computer. In this case, the reset control unit is one computer in a computer system having a cluster configuration. In a blade computer, the reset control unit may also be located inside a case of the blade computer. For example, the reset control unit is a control processor for controlling the case of the blade computer.

What is claimed is:

1. A failover method in a cluster computer system comprising:
   a plurality of computers, with respect to the execution of a certain application, at least one of the computers being used as a computer of an active system, and at least one of the other computers being used as a computer of a standby system that takes over processing performed in the computer of the active system;
   a heartbeat path used by each of the plurality of computers to monitor states of the other computers;
   a reset path used by each of the plurality of computers to reset any of the other computers; and
   a reset control unit for controlling reset operation,
   said failover method comprising the steps of:
   issuing by said each computer a reset command for resetting one of the other computers as a target on the basis of monitoring the states of the other computers through the heartbeat path, a reset target of said reset command being any one of the other computers;
   judging whether or not a target of a reset command which has been newly inputted into the reset control unit conflicts with a target and a source of a reset command that is currently being executed;
   if it is judged that the newly inputted reset command conflicts with no reset command that is currently being executed, allowing the reset control unit to transmit the inputted reset command to a destination computer to which said inputted reset command has been issued, and storing information about the transmitted reset command in a buffer as information about a reset command that is currently being executed; and
   upon completion of reset operation executed by the transmitted reset command, deleting from the buffer the information about the reset command that is currently executed.

2. A failover method in a cluster computer system according to claim 1, wherein:
   if it is judged in said judgment step that the newly inputted reset command conflicts with a reset command that is being executed, bringing the newly inputted reset command into a waiting state in the reset control unit, and after a lapse of a specified period of wait time, judging again whether or not the newly inputted reset command which is in a waiting state conflicts with a reset command that is being executed.

3. A failover method in a cluster computer system according to claim 2, said failover method further comprising the step of:
   upon completion of the reset operation performed by the reset command that is being executed, canceling, from among reset commands which are in a waiting state in the reset control unit, the waiting state of a reset command that conflicts with the completed reset command.

4. A failover method in a cluster computer system according to claim 1, said failover method further comprising the steps of:
   storing beforehand, in the reset control unit, a group of computers to which each of the plurality of computers belongs; and
   comparing a group to which a source computer of a newly inputted reset command belongs with a group to which a destination computer of the newly inputted reset command belongs, and if both groups do not agree with each other, notifying the source computer that the reset command cannot be executed.

5. A failover method in a cluster computer system according to claim 1, said failover method further comprising the steps of:
   storing beforehand, in the reset control unit, the priority of each of the plurality of computers with respect to reset operation, said each computer resetting any of the other computers; and
   comparing the priority of a source computer of a newly inputted reset command with the priority of a destination computer of the newly inputted reset command, and if the priority of a source computer of a newly inputted reset command is lower than that of a destination computer of the newly inputted reset command, notifying the source computer that the reset command cannot be executed.

6. A failover method in a cluster computer system comprising:
   a plurality of computers, with respect to the execution of a certain application, at least one of the computers being used as a computer of an active system, and at least one of the other computers being used as a computer of a standby system that takes over processing performed in the computer of the active system;
   a heartbeat path used by each of the plurality of computers to monitor states of the other computers;
   a reset path used by each of the plurality of computers to reset any of the other computers; and
   a reset control unit for controlling reset operation,
   said failover method comprising the steps of:
   providing each of the plurality of computers with the priority by which said each of the plurality of computers resets any of the other computers;
   issuing by said each computer a reset command for resetting one of the other computers as a target on the basis of monitoring the states of the other computers through the heartbeat path, a reset target of said reset command being any one of the other computers;
   comparing the priority of a source computer of a reset command, which has been newly inputted into the reset control unit, with the priority of a source computer and the priority of a destination computer of the newly inputted reset command;
   in said comparison step, if the priority of the source computer is higher than those of the source computer and the destination computer, transmitting the newly inputted reset command to the destination computer;
   in said comparison step, if the priority of the source computer is not higher than those of the source computer and the destination computer, bringing the newly inputted reset command into a waiting state in the reset control unit, and after a lapse of a specified period of wait time, transmitting, to the destination computer, the newly inputted reset command that has been brought into a waiting state; and upon completion of reset operation performed by the transmitted reset command, deleting, from among reset commands that are in a waiting state in the reset control unit, a reset command conflicting with the completed reset operation from the reset control unit.

7. A failover method in a cluster computer system comprising:

a plurality of computers, with respect to the execution of a certain application, at least one of the computers being used as a computer of an active system, and at least one of the other computers being used as a computer of a standby system that takes over processing performed in the computer of the active system;

a heartbeat path used by each of the plurality of computers to monitor states of the other computers;

a reset path used by each of the plurality of computers to reset any of the other computers; and a reset control unit for controlling reset operation, said failover method comprising the steps of:

providing each of the plurality of computers with the priority by which said each of the plurality of computers resets any of the other computers;

issuing by said each computer a reset command for resetting one of the other computers as a target on the basis of monitoring the states of the other computers through the heartbeat path, a reset target of said reset command being any one of the other computers;

comparing the priority of a source computer of a reset command, which has been newly inputted into the reset control unit, with the priority of a source computer and the priority of a destination computer of the newly inputted reset command;

in said comparison step, if the priority of the source computer is higher than that of the destination computer, judging whether or not the newly inputted reset command conflicts with a reset command that is currently being executed, and if it is judged that the newly inputted reset command conflicts with no reset command, transmitting the newly inputted reset command to the destination computer;

as a result of the judgment, if it is judged that the newly inputted reset command conflicts with a reset command that is currently being executed, bringing the newly inputted reset command into a waiting state in the reset control unit, and after a lapse of a specified period of time, judging again whether or not the reset command which has been brought into a waiting state conflicts with a reset command that is currently being executed;

in said comparison step, if the priority of the source computer is not higher than that of the destination computer, bringing the newly inputted reset command into a waiting state in the reset control unit, and after a lapse of a specified period of time, transmitting, to the destination computer, the reset command that has been brought into a waiting state; and upon completion of reset operation performed by the transmitted reset command, deleting, from among reset commands that are in a waiting state in the reset control unit, a reset command conflicting with the completed reset operation from the reset control unit.

8. A failover method in a cluster computer system comprising:

a plurality of computers, with respect to the execution of a certain application, at least one of the computers being used as a computer of an active system, and at least one of the other computers being used as a computer of a standby system that takes over processing performed in the computer of the active system;

a heartbeat path used by each of the plurality of computers to monitor states of the other computers;

a reset path used by each of the plurality of computers to reset any of the other computers; and a reset control unit for controlling reset operation, said failover method comprising the steps of:

storing beforehand, in the reset control unit, a group of computers to which each of the plurality of computers belongs;

issuing by said each computer a reset command for resetting one of the other computers as a target on the basis of monitoring the states of the other computers through the heartbeat path, a reset target of said reset command being any one of the other computers;

comparing the priority of a source computer of a reset command, which has been newly inputted into the reset control unit. with the priority of a source computer the priority of and a destination computer of the newly inputted reset command, and if it is judged that the newly inputted reset command conflicts with no reset command that is currently being executed, allowing the reset control unit to transmit the inputted reset command to a destination computer to which said inputted reset command has been issued; and comparing a group to which a source computer of an issued reset command belongs with a group to which a destination computer of the issued reset command belongs, and if both of the groups agree with each other, transmitting the issued reset command to the destination computer, whereas if both of the groups do not agree with each other, notifying the source computer that the reset command cannot be executed.

9. A failover method in a cluster computer system according to claim 8, wherein:

in said comparison step, if the priority of the source computer is not higher than that of the destination computer, providing the newly inputted reset command with a flag for discriminating from a reset command that is brought into a waiting state according to the result of the judgment step, and then bringing the newly inputted reset command into a waiting state in the reset control unit.

10. A failover method in a cluster computer system comprising:

a plurality of computers, with respect to the execution of a certain application, at least one of the computers being used as a computer of an active system, and at least one of the other computers being used as a computer of a standby system that takes over processing performed in the computer of the active system;

a heartbeat path used by each of the plurality of computers to monitor states of the other computers;

a reset path used by each of the plurality of computers to reset any of the other computers; and a reset control unit for controlling reset operation, said failover method comprising the steps of:

storing beforehand, in the reset control unit, the priority of each of the plurality of computers with respect to reset operation, said each computer resetting any of the other computers;

issuing by said each computer a reset command for resetting one of the other computers as a target on the basis of monitoring the states of the other computers through the heartbeat path, a reset target of said reset command being any one of the other computers; and comparing the priority of a source computer of an issued reset command with the priority of a source computer and the priority of a destination computer of the issued reset command, and if the priority of a source computer of a newly inputted reset command is higher than the priority of a source computer and the priority of a destination computer of the newly inputted reset command, transmitting the issued reset command to the destination computer, whereas if the priority of a source computer of a newly inputted reset command is lower than the priority of a source computer or the priority of a destination computer of the newly inputted reset command, notifying the source computer that the reset command cannot be executed.

11. A computer system having a cluster configuration, said computer system comprising:

a plurality of computers, with respect to the execution of a certain application, at least one of the computers being used as a computer of an active system, and at least one of the other computers being used as a computer of a standby system that takes over processing performed in the computer of the active system;

a heartbeat path used by each of the plurality of computers to monitor states of the other computers; and a reset control unit for receiving a reset command, which is issued by each of the plurality of computers to one of the other computers, making a judgment, and on the basis of the result of the judgment, transmitting the received reset command to a target computer to be reset, wherein:

said reset control unit includes:

a buffer for storing information about the reset command that has been transmitted to the target computer to be reset; and a control module for controlling the buffer, and comparing a target of the inputted reset command with the information of a target and a source of a reset command that is currently being executed as stored in the buffer so as to make said judgment.

12. A computer system having a cluster configuration according to claim 11, wherein:

when transmitting a reset command to its target computer to be reset, said control module stores at least a destination of the reset command as information about the reset command that is being executed, and if a source or a destination of a newly inputted reset command agrees with any one of destinations of reset commands that are being executed, it is judged that the newly inputted reset command conflicts with a reset command that is being executed, and accordingly transmission of the newly inputted reset command is postponed.

13. A computer system having a cluster configuration, said computer system comprising:

a plurality of computers, with respect to the execution of a certain application, at least one of the computers being used as a computer of an active system, and at least one of the other computers being used as a computer of a standby system that takes over processing performed in the active system;

a heartbeat path used by each of the plurality of computers to monitor states of the other computers; and a reset control unit for receiving a reset command, which is issued by each of the plurality of computers to one of the other computers, making a judgment, and on the basis of the result of the judgment, transmitting the received reset command to a target computer to be reset, wherein:

said reset control unit includes:

a first buffer for storing information about the reset command that has been transmitted to the target computer to be reset;

a second buffer for storing a reset command that is brought into a waiting state as a result of postponing transmission of the reset command to the target computer to be reset; and a control module for comparing a target of the inputted reset command with the information of a target and a source of a reset command that is currently being executed as stored in the buffers so as to make said judgment, and for, if it is judged that the inputted reset command conflicts with a reset command that is being executed, postponing transmission of the inputted reset command to the target computer to be reset so that the received reset command is brought into a waiting state in the second buffer.

14. A computer system having a cluster configuration according to claim 13, wherein:

said second buffer stores a source and a destination of a reset command, transmission of which has been postponed, and the wait time during which the reset command is kept in a waiting state; and after the reset command is brought into a waiting state, if the wait time stored corresponding to the reset command has elapsed, said control module makes the judgment again as to whether or not the reset command in question conflicts with a reset command that is being executed.

15. A computer system having a cluster configuration, said computer system comprising:

a plurality of computers, with respect to the execution of a certain application, at least one of the computers being used as a computer of an active system, and at least one of the other computers being used as a computer of a standby system that takes over processing performed in the active system;

a heartbeat path used by each of the plurality of computers to monitor states of the other computers; and a reset control unit for receiving a reset command, which is issued by each of the plurality of computers to one of the other computers, making a judgment, and on the basis of the result of the judgment, transmitting the received reset command to a target computer to be reset, wherein:

said reset control unit includes:

a first buffer for storing: information about the reset command that has been transmitted to the target computer to be reset, and that is currently being executed; and the priority by which each of the plurality of computers resets any of the other computers as a result of monitoring states of the other computers;

a second buffer for storing a reset command that is brought into a waiting state as a result of postponing transmission of the reset command to the target computer to be reset; and a control module for comparing the priority of a source of an inputted reset command with the priority of a destination of the inputted reset command, and if the priority of a destination of the inputted reset command is higher than that of a source of the inputted reset command, bringing the inputted reset command into a waiting state in the second buffer so as to wait for a reset command from a computer whose priority is higher, whereas if the priority of a destination of the inputted reset command is lower than that of a source of the inputted reset command, making a further judgment as to whether or not a target of the inputted reset command conflicts with a target and a source of a reset command that is being executed, and, if it is judged that a reset conflict occurs, bringing the inputted reset command into a waiting state in the second buffer so as to wait for the completion of the reset command that is being executed, whereas if it is judged that no reset conflict occur, transmitting the inputted reset command to the target computer to be reset.

16. A computer system having a cluster configuration according to claim 15, wherein:

said reset control unit includes an interface capable of independently setting first wait time during which a reset command is kept in a waiting state so as to wait for another reset command issued from a computer whose priority is higher, and second wait time during which a reset command is kept in a waiting state so as to wait for the completion of the reset command that is being executed.

* * * * *